Figure 8:
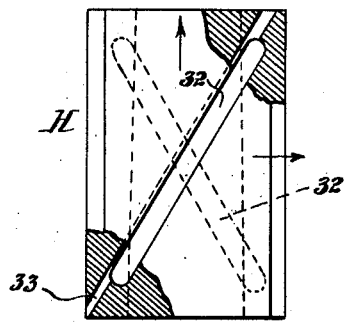

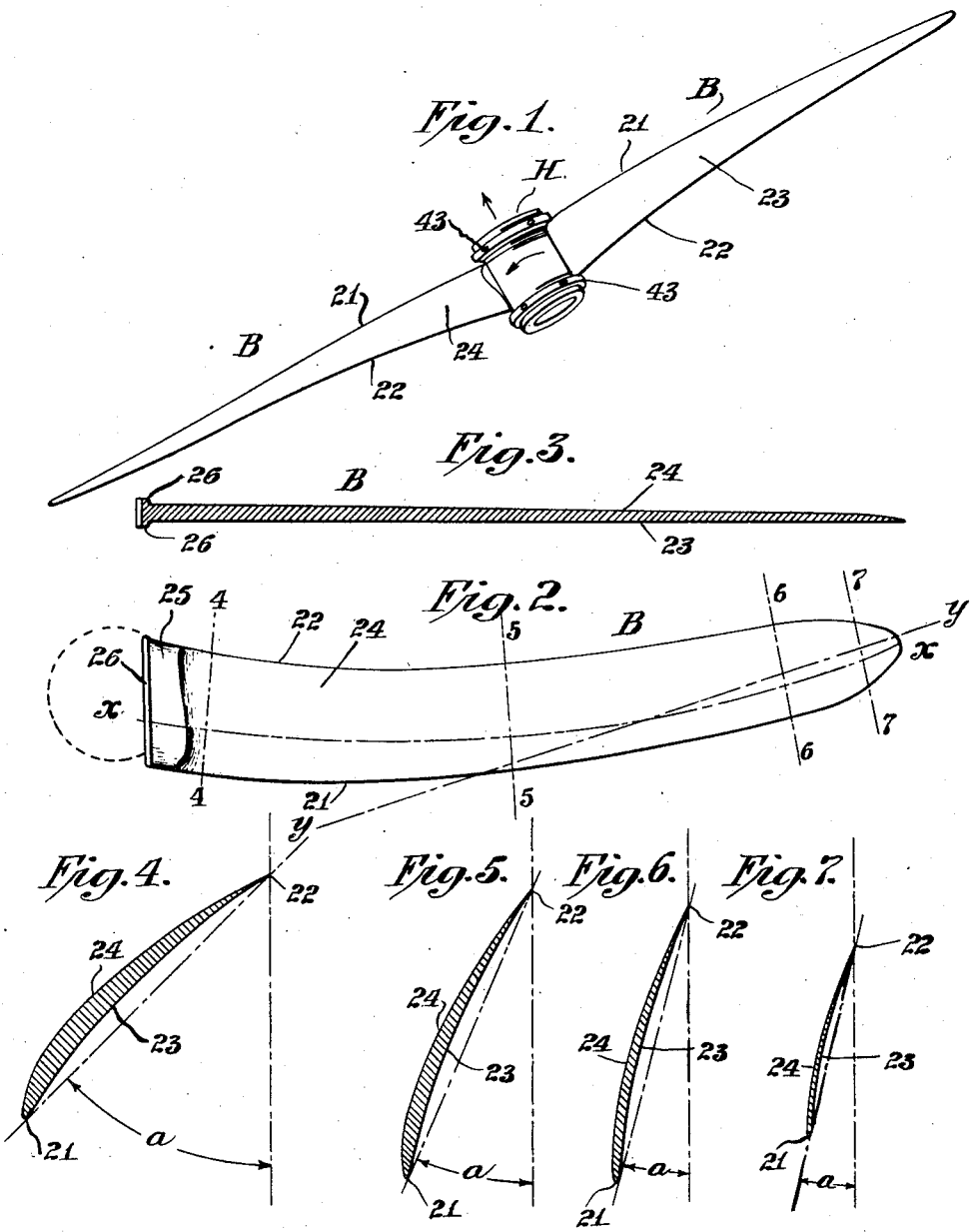

Feb. 7, 1928.

C. W. HALL 1,658,438

PROPELLER

Filed Aug. 13, 1925      3 Sheets-Sheet 2

Charles W. Hall
INVENTOR

BY W. B. Whitney
ATTORNEY

Feb. 7, 1928.
C. W. HALL
1,658,438
PROPELLER
Filed Aug. 13, 1925
3 Sheets-Sheet 3
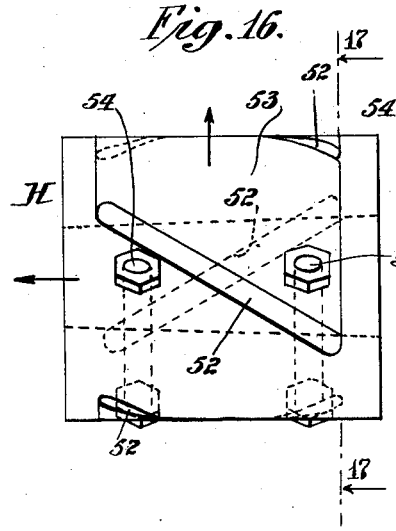
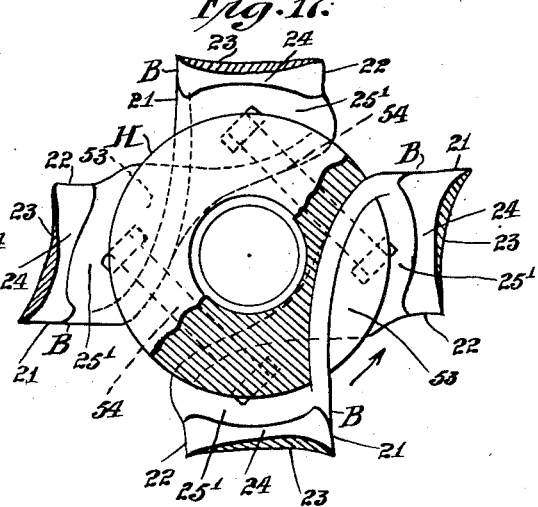
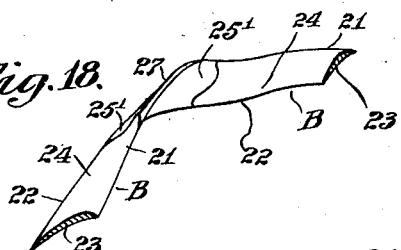
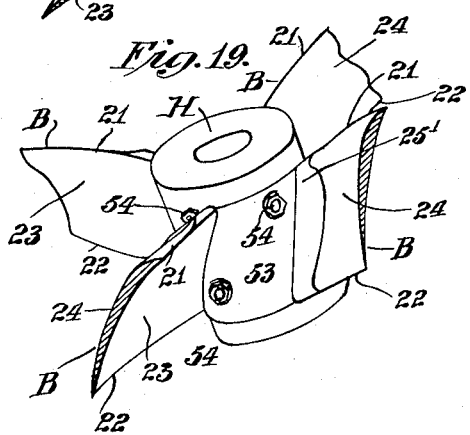
Charles Ward Hall
INVENTOR
BY Wm B. Whitney
ATTORNEY Patented Feb. 7, 1928.

1,658,438

UNITED STATES PATENT OFFICE.

CHARLES WARD HALL, OF LARCHMONT, NEW YORK.

PROPELLER.

Application filed August 13, 1925. Serial No. 49,888.

This invention relates to a propeller, more particularly to an aeronautical propeller, and the object thereof is to provide a propeller for air craft and the like which is efficient, is light in weight, and can be produced at low cost, and, further, to provide a propeller on which the torque increases considerably when used at angles of attack below the angle of no thrust.

To this end my new propeller comprises a hub and a plurality—two, three, or more—of blades, both of which are of novel design, and the root end of the blades are inserted in the hub and therein locked preferably throughout their entire width.

The blades are throughout of aerofoil section, are swept rearwardly on curved lines and are tapered both in chord width and in thickness from root to tip, and have an approximately helical twist which gives them a pitch angle relatively large at the root and diminishing from root to tip at a progressively decreasing rate and a slight concave upper or forward radial camber. The aerofoil section is of the same type from root to tip and is characterized by a convexly cambered upper or forward surface, a concavely cambered under or rear surface, a sharp trailing edge and a somewhat less sharp leading edge. The angular convergence of the tangents to the upper and lower surfaces at the trailing edge, which preferably is most acute at the tip, does not vary more than five degrees. The concave under camber of the blade sections is preferably such that the maximum blade thickness, outside of a span not exceeding one-half of the chord width on either side of the hub, will be about .06 of the chord and not substantially over .6 of the maximum camber of the upper surface; and from such maximum, at the hub, the blade thickness gradually decreases outwardly to about but not less than forty per cent thereof near the tip. The leading and trailing edges are curved rearwardly from the root outwards on somewhat converging lines and with a radius of curvature which gradually increases towards the tip, while at the tip the leading edge is swept back and the trailing edge forward to form a more or less sharply rounded outer end. As the result of these combined features the blades have from root to tip, along the line of the center of gravity of the successive blade sections, a progressive forward sweep in the line of forward movement, or as seen in a side view of a the propeller, and a progressive backward sweep in the plane of rotation, as seen in a front view of the propeller.

The increased efficiency which is obtained by the propeller blades of the design described is due in part to the high pitch angle at the hub with the constantly but less and less rapidly decreasing angularity from the hub outwards and aerofoil section of the same type throughout and in part to the thinner blade sections produced by the concave under camber and made possible by reason of the compensation of bending stress by centrifugal force, due to the special side and front view form of the blades. It has been found that with the contributory action of centrifugal force the forward sweep of the gravity axis of the blades, in the line of forward movement, will substantially balance the bending moment due to thrust forces. The torque forces are balanced mainly by the backward sweep of the gravity axis of the blades—the plan form or front view curvature—as referring to the radius through the hub at the blade anchorages. Consequently, when driven at the intended useful or operating speeds, the blades are subjected only to tension and shear, there being no compression as the result of the combined forces along any part of the blade span. Furthermore, the curving sweepback of the gravity axis in the plane of rotation and the concave under camber, which promotes a rearward shifting of the center of pressure, together so control the rate of change of the twist of the blades under flight conditions, by decreasing their angle of attack near the tip, particularly at the higher speeds of rotation and advance, as to practically eliminate flutter; while the concave under camber, whereby the moment of inertia is reduced less in proportion to the thickness than if this under surface were flat, not only has the effect of reducing the thickness of the blade sections and hence the weight of the blades but also has the further advantage of increasing the thrust at medium or small positive angles of attack and, of even more importance for propeller uses, of increasing the torque for negative angles of attack and thereby restraining the usual tendency of engines to race under such conditions, thus combining a high efficiency in speed with a high efficiency in climb neither of which is usually to be obtained without sacrifice of the other.

The blades may be conveniently and cheaply made in the following manner: A blank is first cut from a metal plate of the required thickness, preferably a plate of duralumin, to the approximate developed shape or plan of the blade. This blank is laid upon a cylindrical or slightly tapering conical mandrel, with its axis substantially parallel to the axis of the mandrel for say a third of its length from the tip back and thence to the root diverging therefrom at a greater and greater angle, and heavy pressure is applied so as to shape the blank to the mandrel and to cause some flow of the metal therein. The blank is thus given a permanent set with a concave camber in its under surface which through its tip section conforms to the radius of the forming mandrel and thence to the root becomes more and more elliptical, and also a helical twist which at the root is quite pronounced and from the root outwardly gradually decreases until it is nearly washed out at the tip; but the degree of the helical curvature is not sufficient to produce a set of the metal along the length of the blade and consequently, upon removal of the pressure, its ends will spring upwardly or outwardly somewhat so that its upper surface, which is convexly cambered as to chord, will have a slight concave camber as to span. After the blank has thus been twisted and cambered its upper surface is or may be milled to correct tapering aerofoil form by a single pass through a plain milling machine under the control of guides by which, starting close to its root end, it is both swung around and partially turned in passing under the cutter in a manner to maintain a practically uniform but very slight change of slope at the trailing edge while producing the decreasing convex camber and thickness from root to tip. The curved and twisted blades can of course be cut from a plate of suitable cylindrical form, but in such case the upper longitudinal concave camber referred to will require an additional process. Moreover, it is practically impossible to obtain cylindrical sections of duralumin of the required diameter.

The hub on which I mount my new propeller blades may have formed in its walls the required number of straight radial slots, extending diagonally the axis thereof at an angle which will give the blades the desired pitch angle at the hub, and into these slots the flattened root ends of the blades may be fitted and there keyed in place, for example, by one or more slightly tapering pins driven into similarly tapering keyways which are drilled each one-half in the side of the slot and one-half in the side of the blade. Preferably, however, the roots of the blades, curved in the arc of a circle and upset and flanged on both their sides, are slidingly inserted in diagonally disposed and correspondingly curved T-slots formed in the walls of the hub and open at one of its ends to a position therein which will give the blades the desired pitch angle and are there adjustably secured between two internally-threaded rings which are screwed upon the externally-threaded ends of the hub. For multi-bladed propellers, when the blades are in multiples of two, each of the pairs of blades may be made from a single integral blank and bent centrally to a right angle for a four-bladed propeller over a cylindrical mandrel placed diagonally thereof at an angle corresponding to the desired pitch angle at the hub, without any reversal of the pitch of the blades themselves, and secured thereat in a suitably shaped open slot formed in the walls of the hub diagonally of its axis by means of a diagonal spacer-block fitting into the curved diagonal bend between the blades and secured by bolts passing through the blades and hub.

The invention is shown, by way of illustration and not of limitation, in the accompanying drawings, in which—

Figure 10:
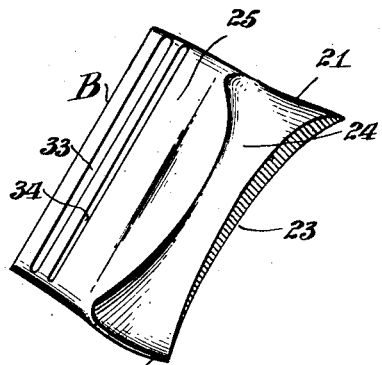
Figure 9:
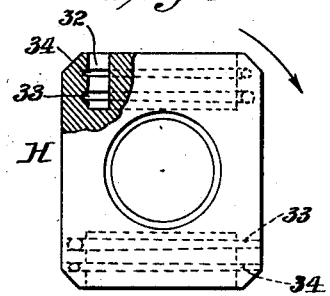
Figure 11:
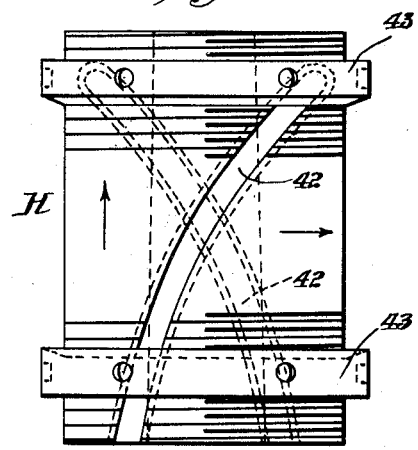
Figures 13, 14, 15:
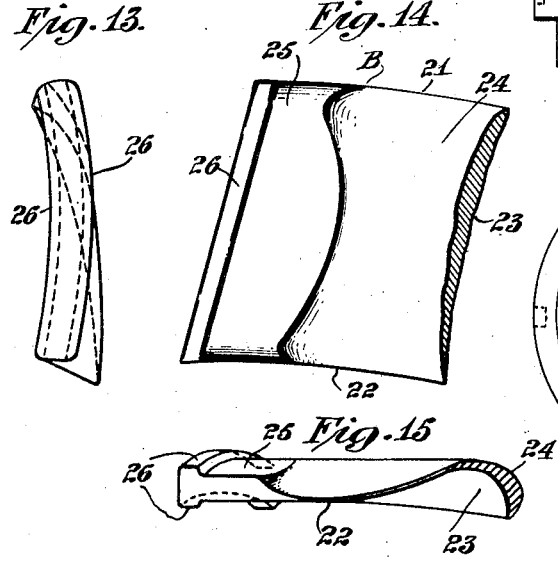
Figure 12:
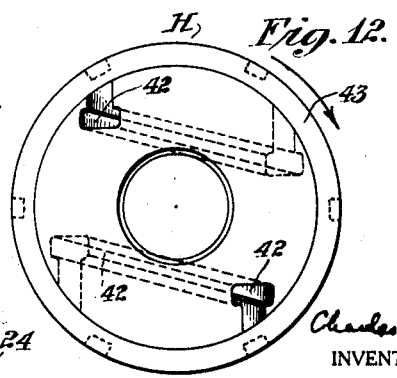

Figure 1 is a perspective view of a two-bladed left-handed propeller embodying my improvements; Figs. 2 and 3 are views, slightly enlarged, of one of the propeller blades, showing the blade in a developed plan or side view and in longitudinal section along its gravity axis, approximately the line $x\ x$ of Fig. 2, respectively; Figs. 4, 5, 6 and 7 are views, further enlarged, showing the aerofoil section of the blade and its pitch angle on the lines 4 4, 5 5, 6 6, and 7 7 of Fig. 2, respectively; Fig. 8 is a side view of a simple form of hub for a right-hand propeller, partially broken away, and Fig. 9 is a rear end view of the same, also partially broken away; Fig. 10 is a view showing in perspective a portion of the root end of a propeller blade adapted for use with the hub shown in Figs. 8 and 9; Figs. 11 and 12 are side and rear end views, respectively, of a modified and the preferred form of propeller hub; Figs. 13, 14 and 15 are views of a portion of the root end of a propeller blade adapted for use with the hub of Figs. 11 and 12, showing the same in end, side and edge perspective, respectively; Fig. 16 is a side view of a further modified hub, adapted for four propeller blades made in pairs of two each; Fig. 17 is a rear end view, partially in section, of the hub of Fig. 16 with the broken root ends of two pairs of propeller blades mounted therein; Fig. 18 is a detail showing in perspective the bent elbow portion of an integral pair of propeller blades; and Fig. 19 is a perspective of the hub and the broken root end of the propeller blades shown in Fig. 17.

Referring to the drawings, H indicates the hub and B B the blades of the propeller, the hub and blades shown in Figs. 1–7 being those of a left-handed propeller while as shown in the remaining figures these parts are all those of right-handed propellers.

In making the blades, in the manner hereinabove outlined, a blank is first cut from a flat metal plate to a form substantially as of the outline shown in Fig. 2, wherein 21 indicates the leading and 22 the trailing edge of the blade. The blank is then laid upon the cylindrical or slightly tapering conical mandrel, of the radius required to give the blade the desired under camber, with what is to become the gravity axis of the blade, indicated by the dash and dot line $x\ x$, related to the axis of the mandrel, indicated by the similar line $y\ y$, approximately as shown in Fig. 2, and is shaped thereon to the surface of the mandrel by pressure. The blank is thus given a permanently set concave under surface 23 and a twist which diminishes at a progressively slower rate from root to tip and so provides a pitch angle $a$ approximately as shown at typical sections in Figs. 4-7. The convexly cambered upper surface 24 of the blade is then formed by passing the blank through a milling machine in the manner described, starting (or terminating) the milling operation at a slight distance from the root end of the blade so as to leave thereat a short shank 25.

When a pair of blades is to be formed from a single blank, as for the four-bladed propeller illustrated in Figs. 16-19, a double blank is cut out with the leading edge of both blades at the same edge of the blank. One end of the blank is then placed upon the mandrel and pressed to shape and then the blank is turned over and the other end, with the opposite face of the blank now in contact with the mandrel, is shaped in the same manner. The integral central shank portion 25', which joins the roots of the two blades, is then flattened and bent, about a diagonal axis of substantially the pitch angle near the hub, so as to bring the two blades into position at a right angle radially to each other, as best illustrated in Fig. 18.

The hub, in its simplest form as illustrated in Figs. 8 and 9, has formed in its opposite sides straight diagonally disposed radial slots 32 32, to which the shanks 25 of the blades, first flattened, are fitted. The blades are keyed in position in these slots by means of slightly tapering pins (not shown) which are driven into the circular tapering keyways 33 and 34 drilled through the hub and located one-half in the side of the slot and one-half in the adjacent side of the shank of a blade.

In the preferred form of the hub, illustrated in Figs. 11 and 12, there are formed in its opposite sides the filleted T-slots 42 42 which are curved in the arc of a circle, and are open to one, preferably the rear, end thereof, and two internally-threaded rings 43 43 are adapted to be screwed, by means of spanners, upon the externally-threaded ends of the hub. For use with this hub the shanks 25 of the blades are upset at the end and milled to provide the oppositely projecting transverse end flanges 26 26, which slidingly fit the undercut sides of the T-grooves in the hub. The ring on the rear end of the hub being removed, the flanged shanks of the blades are inserted in the open ends of the slots and pushed forward therein until their leading edges abut against the ring upon the forward end of the hub, and then the ring is screwed upon the rear end of the hub and tight up against the edges of the shanks of the blades. By first screwing the forward ring forward or backwards, the position and thereby the pitch angle of the two blades can be adjusted within limits as desired.

For the four-bladed propeller illustrated in Figs. 16-19, the hub has formed in opposite sides of its walls diagonally disposed elbow slots 52 52 the bottoms of which are rounded, in a plane perpendicular to their diagonal sides, in the arc of a circle to adapt them to receive the bent central portion 27 of the integral shanks 25' of the two pairs of blades. The blades are secured within these slots by suitably shaped spacer blocks 53 53 which fit into the hollow of the bend between the shanks of the blades and are bolted together by bolts 54 54 two of which pass through the shank portion of each pair of blades and a portion of the walls of the hub.

It is of course to be understood that the curvature of the leading and trailing edges, the upper and lower camber, and the twist of the blades as herein shown are approximate only, since they will all vary considerably, in practice, according to the type and intended service of the aircraft for which the propeller is designed. It is also to be understood that the efficiency and other advantages of blades of the design herein disclosed are independent of the particular hub used therewith and consequently that any suitable hub may be substituted for the hubs herein shown and described.

What I claim as new, and desire to secure by Letters Patent, is—

1. A propeller with blades each of which from root to tip is of aerofoil section with smooth concavely cambered under and convexly cambered upper surface.

2. A propeller with blades each of which from root to tip is of aerofoil section having a smooth convexly cambered upper surface, a smooth concavely cambered under surface, and a sharp trailing edge along which the included angle of the tangents to the upper and lower surfaces of the blades does not vary more than five degrees.

3. A propeller with blades the gravity axes of which sweep from the root outwards forwardly in the line of the forward movement of the propeller.

4. A propeller with blades of aerofoil section the gravity axes of which through at least the outer half of their length have a sweep backwards in the plane of their rotation.

5. A propeller with blades which are throughout of convex-concave aerofoil section of the same type and the gravity axes of which extend outwardly with a speed forward in the line of the forward movement and backward in the plane of rotation of the propeller.

6. A propeller with blades which are of aerofoil section outwardly tapering and which are so twisted as to give them a pitch angle relatively high at the hub and thence outwardly decreasing at a progressively decreasing rate.

7. A propeller with blades which are of outwardly tapering convex-concave aerofoil section and are so shaped and twisted as to give their gravity axes an outward sweep forwardly in the line of the forward movement and rearwardly in the plane of rotation of the propeller.

8. A rigidly mounted propeller blade in which the torque and thrust stresses to which it is subjected when driven at the intended speed of rotation and advance are balanced by centrifugal force by means of an outward sweep of its gravity axis forwardly in the line of its forward movement and rearwardly in the plane of its rotation.

9. A propeller blade which throughout its length has a smooth convex upper and a smooth concave under camber, tapers gradually both in chord width and in thickness, and through the outer portion of its length is swept backwards in the plane of its rotation.

10. A propeller blade in which both leading and trailing edges are swept backwardly from its root outwardly to near its tip on curved lines the radius of which gradually increases.

11. A propeller blade of convex-concave aerofoil section in which the concave under camber is such as to give the blade close to the hub a maximum thickness which does not substantially exceed .6 of the maximum convex upper camber of its effective surface.

12. A propeller blade of aerofoil section in which the maximum thickness of its effective surface at any point in its length does not substantially exceed .06 of the chord width at such point.

13. A propeller blade of aerofoil section having a thickness which is maximum at the hub and thence outwardly decreases regularly to not less than about forty per cent of such maximum thickness near the tip.

14. A propeller blade of smooth aerofoil section which is convexly-concavely cambered as to its chords and as to its span has a slight concave upper or forward radial camber.

15. In a propeller of the type described, the combination of a plurality of blades each with root ends of substantially the maximum chord width, a hub with diagonally disposed radial slots adapted to receive the roots of the blades, means for locking the blade roots within the slots throughout their entire width, and means bearing against the edges of the blade roots for preventing a shifting thereof lengthwise of the slots.

16. In a propeller of the type described the combination of a plurality of blades having at their root ends curved shanks which are upset and flanged across the end on both sides, a hub having formed in its walls a plurality of diagonally disposed curved T-slots which are open at one end thereof and into which the shanks of the blades may be inserted, and means for securing the shanks of the blades in adjusted position within the slots in the hub.

17. A propeller of the type described comprising pairs of blades each of which pairs is made from a single blank and has an integral connecting shank which is bent centrally about a diagonal axis to bring the two blades into the plane of rotation at a substantial radial angle to each other, a hub provided with diagonally disposed slots adapted to receive the bent shanks of the blade pairs, and shaped blocks fitting within the bend between the shanks of the blade pairs and secured to the hub by bolts passing through the shank portion of the blade pairs.

18. A propeller blade of convex-concave aerofoil section with leading and trailing edges curving rearwardly from the root on slightly converging lines and having an approximately helical twist which gives it a pitch angle relatively large at the root and diminishing from root to tip at a progressively decreasing rate.

19. A propeller blade of convex-concave aerofoil section with leading and trailing edges curving rearwardly from the root on slightly converging lines and on a gradually increasing radius of curvature and having a helical twist with the characteristics of a twist produced by forcing the under surface of the blade into conformity with the surface of a substantially cylindrical mandrel while the axis of the blade for the outer portion of its length extends approximately parallel to the axis of the mandrel.

CHARLES WARD HALL.